(12) United States Patent
Mohandoss et al.

(10) Patent No.: US 11,158,090 B2
(45) Date of Patent: Oct. 26, 2021

(54) ENHANCED VIDEO SHOT MATCHING USING GENERATIVE ADVERSARIAL NETWORKS

(71) Applicant: Adobe Inc., San Jose, CA (US)

(72) Inventors: Tharun Mohandoss, West Bengal (IN); Pulkit Gera, Uttarakhand (IN); Oliver Wang, Seattle, WA (US); Kartik Sethi, Delhi (IN); Kalyan Sunkavalli, San Jose, CA (US); Elya Shechtman, Seattle, WA (US); Chetan Nanda, New Delhi (IN)

(73) Assignee: Adobe Inc., San Jose, CA (US)

( * ) Notice: Subject to any disclaimer, the term of this patent is extended or adjusted under 35 U.S.C. 154(b) by 68 days.

(21) Appl. No.: 16/692,503

(22) Filed: Nov. 22, 2019

(65) Prior Publication Data

US 2021/0158570 A1 May 27, 2021

(51) Int. Cl.
*G06T 7/90* (2017.01)
*G06K 9/00* (2006.01)
(Continued)

(52) U.S. Cl.
CPC ............ *G06T 7/90* (2017.01); *G06K 9/00744* (2013.01); *G06K 9/00758* (2013.01); *G06K 9/622* (2013.01); *G06K 9/6256* (2013.01); *H04N 9/64* (2013.01); *G06T 2207/10016* (2013.01); *G06T 2207/20076* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 10,382,799 B1 * 8/2019 Walters ................. G06F 16/215
10,758,309 B1 * 9/2020 Chow ................. G06K 9/00718
(Continued)

OTHER PUBLICATIONS

Bo Zhang, Mingming He, Jing Liao, Pedro V Sander, Lu Yuan, Amine Bermak, and Dong Chen. Deep exemplar based video colorization. In Proc. of the IEEE Conf. on computer vision and pattern recognition, pp. 8052-8061, Jun. 2019. (Year: 2019).*

(Continued)

*Primary Examiner* — Andrae S Allison
(74) *Attorney, Agent, or Firm* — Kilpatrick Townsend & Stockton LLP

(57) ABSTRACT

This disclosure involves training generative adversarial networks to shot-match two unmatched images in a context-sensitive manner. For example, aspects of the present disclosure include accessing a trained generative adversarial network including a trained generator model and a trained discriminator model. A source image and a reference image may be inputted into the generator model to generate a modified source image. The modified source image and the reference image may be inputted into the discriminator model to determine a likelihood that the modified source image is color-matched with the reference image. The modified source image may be outputted as a shot-match with the reference image in response to determining, using the discriminator model, that the modified source image and the reference image are color-matched.

20 Claims, 9 Drawing Sheets
(2 of 9 Drawing Sheet(s) Filed in Color)

(51) Int. Cl.
   G06K 9/62       (2006.01)
   H04N 9/64       (2006.01)

(56) References Cited

U.S. PATENT DOCUMENTS

| 10,860,892 | B1* | 12/2020 | Truong | G06F 3/0653 |
|---|---|---|---|---|
| 2019/0197358 | A1* | 6/2019 | Madani | G06N 3/0481 |
| 2019/0355155 | A1* | 11/2019 | Shugrina | G06T 15/503 |
| 2019/0392624 | A1* | 12/2019 | Elgammal | G06K 9/6259 |
| 2020/0134472 | A1* | 4/2020 | Choi | G06N 3/0472 |
| 2021/0073669 | A1* | 3/2021 | Banerjee | G06K 9/6256 |

OTHER PUBLICATIONS

Fu, Qiwen, Wei-Ting Hsu, and Mu-Heng Yang. "Colorization using convnet and gan." in Stanford University (2017): 1-8. (Year: 2017).*

Nazeri, Kamyar, Eric Ng, and Mehran Ebrahimi. "Image colorization using generative adversarial networks." International conference on articulated motion and deformable objects. Springer, Cham, 2018. (Year: 2018).*

Sun, Tsai-Ho, et al. "Adversarial colorization of icons based on contour and color conditions." Proceedings of the 27th ACM International Conference on Multimedia. Oct. 2019. (Year: 2019).*

Iizuka, Satoshi, Edgar Simo-Serra, and Hiroshi Ishikawa. "Let there be color! Joint end-to-end learning of global and local image priors for automatic image colorization with simultaneous classification." ACM Transactions on Graphics (ToG) 35.4 (2016): 1-11 (Year: 2016).*

Khodadadeh, Siavash, et al. "Automatic Object Recoloring Using Adversarial Learning." Proceedings of the IEEE/CVF Winter Conference on Applications of Computer Vision. 2021. (Year: 2021).*

He, Mingming, et al. "Deep exemplar-based colorization." ACM Transactions on Graphics (TOG) 37.4 (2018): 1-16. (Year: 2018).*

T. Wang, S. Gong, X. Zhu, and S. Wang. Person reidentification by video ranking. In ECCV, pp. 688-703. Springer, 2014. (Year: 2014).*

Y. Li, Z. Wu, S. Karanam, R. J. Radke, and N. Troy. Multishot human re-identification using adaptive fisher discriminant analysis. BMVC, 2015 (Year: 2015).*

Cho, Yeong-Jun, and Kuk-Jin Yoon. "Improving person re-identification via pose-aware multi-shot matching." Proceedings of the IEEE conference on computer vision and pattern recognition. 2016. (Year: 2016).*

Reinhard, Erik, et al., "Color Transfer Between Images", IEEE Computer Graphics and Applications, 21.5 Sep.-Oct. 2001, p. 34-41.

Li, Feng, et al, "An Approach of Detecting Image Color Cast Based on Image Semantic", Machine Learning and Cybernetics, 2004. Proceedings of 2004 International Conference on. vol. 6. IEEE, 2004, 3 pages.

Wu, Fuzhang, et al. "Content-Based Colour Transfer." Computer Graphics Forum. vol. 32. No. 1. Blackwell Publishing Ltd, 2013, pp. 190-203.

Bonneel, Nicolas, et al. "Example-Based Video Color Grading", ACM Trans. Graph.32.4 (2013): 39-1, 11 pages.

Xiao, Xuezhong, et al., "Temporal Color Morphing." Entertainment Computing—ICEC 2007, 11 pages.

* cited by examiner

ENHANCED VIDEO SHOT MATCHING USING GENERATIVE ADVERSARIAL NETWORKS

TECHNICAL FIELD

The present disclosure generally relates to enhanced image processing. More specifically, but not by way of limitation, the present disclosure relates to training a generative adversarial network (GAN) using pairs of image frames to generate context-sensitive shot-matched images.

BACKGROUND

A video shot of a scene may be captured by multiple digital cameras. In some cases, the inherent differences between the image sensors of each camera may cause the resulting video shots to exhibit different color or brightness attributes. In other cases, video shots captured by the same camera may be captured under different lighting conditions. For example, one shot may be captured under bright conditions, and the other shot may have a color grading associated with a dark scene. Video editing applications can enable users to perform image editing functionality, such as shot-matching, to modify one video shot (e.g., the shot captured under bright conditions) to match the look and feel (e.g., the color grading) of another video shot (e.g., the shot with the color grading of a dark scene). For example, performing shot-matching includes modifying a source image to match the color and brightness attributes of a reference image, so that the modified source and reference images have the same look and feel. As another example, the reference image may be color graded (e.g., in a post editing process) and the source image may not have been color graded. Shot-matching the source image in this example may transfer the color grading of the reference image to the source image. Thus, the shot-matching addresses the factors that make shots different, such as inherent camera differences, external lighting conditions, and so on.

The shot-matching performed by prior art video editing applications, however, is insensitive to the context or semantics of the images. Context-insensitive shot-matching of images with extreme color distribution, for example, can cause a dominant color of the reference image to distort the source image. Further, prior art shot-matching techniques involve training a convolutional neural network (CNN) to learn the context or semantic information of the images. The training data needed to implement the CNN models, however, are technically challenging to generate and often require image pairs to be manually color-matched by a professional colorist. Manually generating color-matched images for training CNN models involves significant time and expense, and thus, is not technically feasible.

SUMMARY

Certain embodiments involve shot-matching images in a context-sensitive manner. In some implementations, an image editing system may include a generative adversarial network (GAN) model. The GAN model may include at least two neural networks; a generator model and a discriminator model. Further, the image editing system may receive a source image and a reference image as input to the GAN model for shot-matching. The source image and the reference image may be unmatched, in that the color grading of the source image may be different from the color grading of the reference image. The generator model may be trained to predict color parameter modifications (e.g., hue, saturation, or luminance) to the source image that would shot-match the modified source image with the reference image. The modified source image, which was generated by the generator model, and the reference image may be input to the discriminator model. The discriminator model may be trained to determine whether a pair of images is shot-matched. The discriminator model may process the modified source image and the reference image to generate an output representing a likelihood that the modified source image and the reference image are shot-matched. The discriminator may calculate a loss based on ground truth images. The loss may be input to the generator model as a feedback signal to update the generator model. Embodiments of this aspect include corresponding computer systems, apparatus, and computer programs recorded on one or more computer storage devices, each configured to perform the actions of the techniques.

In addition, some embodiments include training the GAN model using a set of shot-matched image pairs that are automatically extracted from video data. The image editing system clusters the extracted image frames based on color features (e.g., a histogram of a color parameter, such as hue), forms pairs of image frames within a cluster of images, and removes any pairs of image frames that satisfy a content similarity threshold. The remaining image frames include shot-matched image pairs. Each pair of the remaining shot-matched image pairs include two images that differ in content, but share a similar color grading. The remaining image pairs are used to train the generator model to generate predictions of how to modify the source image to be shot-matched with the reference image. Further, the remaining image pairs are also used to train the discriminator model to detect whether two images are shot-matched. When the discriminator model detects that the modified source image, which is generated by the generator model, and the reference image are shot-matched, then the image editing system outputs the modified source image and the reference image as a shot-matched image pair. Implementations of the described techniques may include hardware, a method or process, or computer software on a computer-accessible medium.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
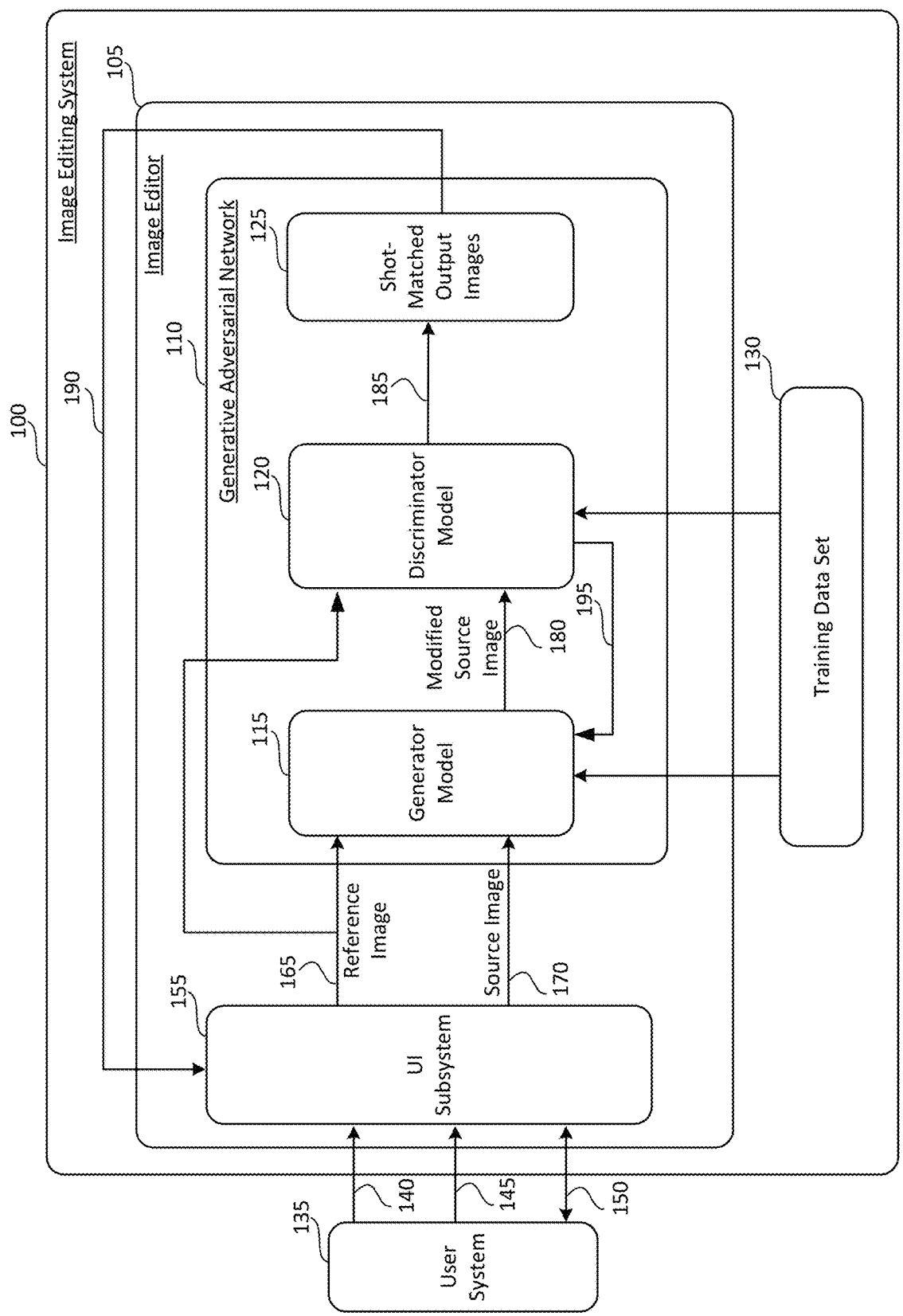
FIG. 1 depicts an example of a network environment for shot-matching two images using a generative adversarial network, according to some aspects of the present disclosure.

The present disclosure relates to automatically shot-matching (interchangeably referred to as color-matching) a source image (e.g., any type of image captured by any type of camera or image sensor) and a reference image (e.g., any type of image captured by the same camera or a different camera or image sensor) by modifying the source image in a context-sensitive manner. Modifying the source image may include modifying the source image to shot-match with the color grading of the reference image. Shot-matching two images with different color styles enables the two images to appear as if they were captured by the same camera or captured under the same lighting conditions (e.g., share a color grading). The shot-matching may be context-sensitive, in that semantic information of the reference image is learned by a neural network to avoid distorting the source image when the reference image contains an extreme color distribution (e.g., a dominant color).

Certain embodiments may be described by the following non-limiting example. In this example, color-matched image pairs are automatically generated and used to train a generative adversarial network (GAN). A training data set of any number of color-matched image pairs is automatically generated by an image editing system. The set of color-matched image pairs included in the training data set is extracted from one or more videos (e.g., image frames extracted at a rate of one frame per second). For example, image frames are extracted from a video (e.g., at one frame per second). The image editing system clusters the extracted image frames based on the histograms of the extracted image frames. A histogram is a graphical representation of the distribution of values of a color parameter of an image frame (e.g., the distribution of hue values of an image). The clustering may be based on a color similarity threshold, which may be a threshold distance between the histograms (e.g., in a Cartesian space, such as an RGB color space). The image editing system forms pairs of images within a cluster of images. Further, the content of each image frame in an image pair is compared against a content similarity threshold. A pair of image frames is removed from the formed pairs within a cluster when the pair of image frames satisfies the content similarity threshold (e.g., the content of the two image frames are similar). Each remaining image pair in the training data set (e.g., each image pair with similar histograms, but different content) represents a color-matched image pair that is used to train the generative adversarial network to shot-match a source image with a reference image.

Continuing with the non-limiting example above, the generative adversarial network includes a generator model and a discriminator model. During training, the generator model is configured to receive two randomly selected images from the training data set (e.g., one image being a source image and the other image being a reference image) as input. In response to receiving the input, the generator model predicts modifications to the source image that would color-match the modified source image with a reference image. For example, the generator model is trained to predict which modification parameter values (e.g., values for hue, luminance, and saturation) would, if applied to the source image, match the modified source image to the color grading of the reference image. Modifying the source image using the predicted modification parameter values corresponds to mimicking color-matched image pairs included in the training data set. The generator model learns to modify a source image to mimic being color-matched with a reference image.

Continuing with the non-limiting example above, the discriminator model receives the reference image and the modified source image generated by the generator model. The discriminator model is trained to differentiate between the color characteristics of the reference image and the modified source image. For example, the discriminator model is configured to receive the modified source generated by the generator and the reference image, and to generate a single value as an output. The output value represents the probability of the two images belonging to the same color grading (e.g., the probability that the two images are color matched). The discriminator model is trained to determine whether the two images are color-matched or not. The discriminator model concatenates the received two images and passes the concatenated images through a set of convolutional layers followed by a dense layer neural network. As an illustrative example, the discriminator model may receive a color-matched image pair from the training data set, along with the synthetic pair generated by the generator model (e.g., the reference image and the modified source image). Further, training the discriminator model may include differentiating between the color-matched image pair and the synthetic pair generated by the generator model. The training of the discriminator model continues until the discriminator model can no longer successfully differentiate between the color-matched image pair and the synthetic pair generated by the generator model.

Thus, the trained generative adversarial network is trained using a set of automatically-generated color-matched image pairs to predict the modification parameter values that would modify a pair of unmatched images to be color-matched (e.g., modify a source image captured by one camera to color-match a reference image captured by another camera). The predicted modification parameter values are generated in a manner that is context sensitive. For example, the generative adversarial network is trained to differentiate between situations in which a dominant color of a reference image should be applied to the source image and situations in which applying the dominant color of the reference image to the source image would significantly distort the source image.

As a technical advantage, certain embodiments of the present disclosure can be implemented in any video or image editing application (e.g., using any set of color parameters). For example, the embodiments of the present disclosure may be applied to any set of color parameters that an image editing application uses to modify the source image. Prior art video or image editing systems that perform shot-matching, however, are based on algorithms specific to the color parameters available within the image editing application. Thus, prior art shot-matching functionality configured for a given image editing application cannot be implemented in different image editing applications. Additionally, as another technical advantage, certain embodiments of the present disclosure perform shot-matching functionality using a neural network to learn the semantic information of an image. The semantic information can be evaluated to enhance the performance of the shot-matching functionality. In certain embodiments, the neural network is trained using a data set of image pairs that are automatically extracted from videos and grouped together based on histogram similarity. The automatically generated training data described in certain embodiments provides a technical advantage over prior art image editing systems. Generating the training data sets for prior art image editing systems, however, often involves the use of professional colorists to create color-matched images for training a neural network.

As described herein, the terms "shot-matching" and "color-matching" may be used interchangeably to refer to an image editing function performable by a video or image editing application. For example, shot-matching may refer to a function that modifies a color grading of a source image (or the color parameters of a raw source image) to match the color grading of a reference image. A source image and a reference image may be any type of image captured by any type of camera or image sensor. The source image and the reference image may have different color gradings, for example, because the source image and the reference image may be captured by different cameras or may be captured by the same camera under different lighting conditions. The shot-matching function may be performed to modify the color parameters of the source image to be color-matched with the reference image. Further, as described herein, semantic information may refer to, for example, information detectable from the visual content of an image that indicates a significance or meaning of the visual content within the image. In certain embodiments, the semantic information of an image is detected using a trained neural network and then used to enhance the shot-matching between two images. For example, the context-sensitive shot-matching described herein may evaluate the semantic information of an image as part of the shot-matching functionality. Context-insensitive shot-matching may refer to shot-matching without any consideration of the semantics of the image. Additionally, a generative adversarial network may refer, for example, to a deep neural network architecture that includes two neural networks (e.g., a generator model and a discriminator model). One neural network is trained to generate new data instances (e.g., the generator model generating modification parameter values that are applied to a source image to generate a modified source image), and the other neural network is trained to determine whether the new data instances belong to the training data set or not (e.g., the discriminator model classifying the modified source image and the reference image as being color-matched or not).

FIG. 1 depicts an example of a network environment for shot-matching two unmatched images using a generative adversarial network, according to some aspects of the present disclosure. For example, FIG. 1 illustrates an image editing system 100. In certain embodiments, the image editing system 100 provides an image editor 105 that incorporates a generative adversarial network 110 for providing image editing functionality, such as context-sensitive shot-matching, to a user. The user operates user system 135 to access the image editing system 100. The image editing functionality includes image processing or image editing.

Figure 8:
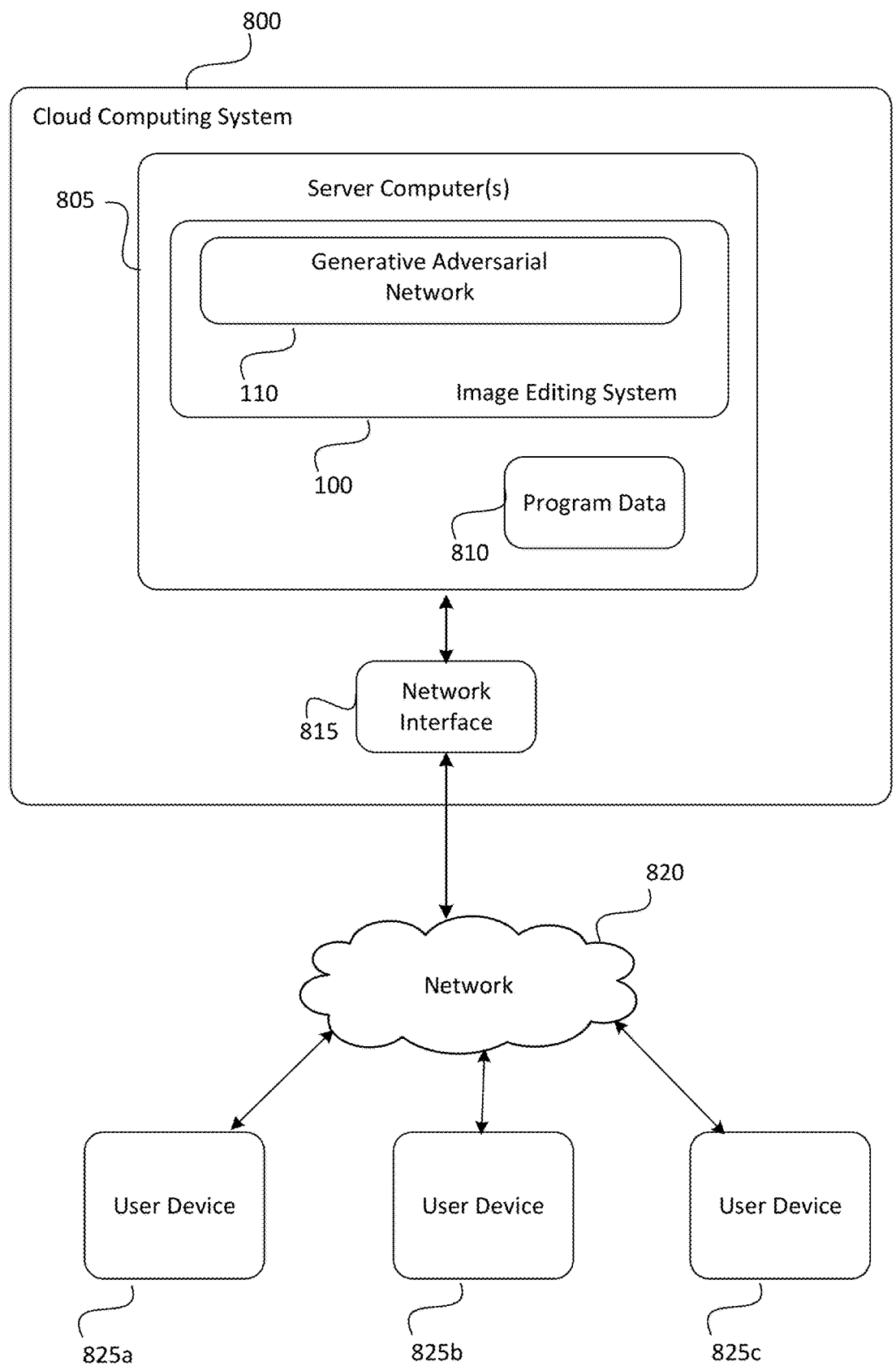
FIG. 8 depicts an example of a cloud computing system for implementing certain embodiments described herein.
Figure 9:
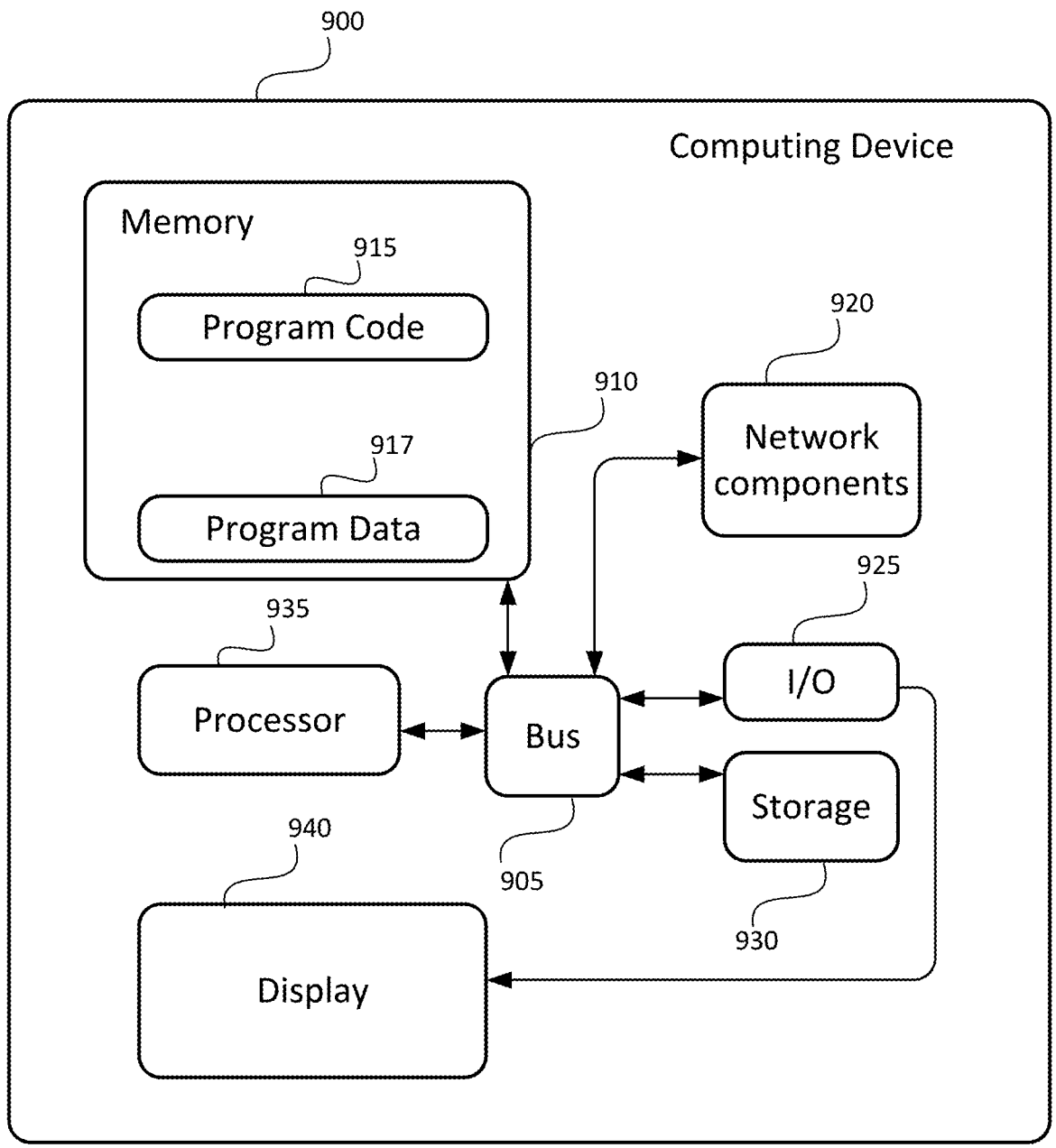
FIG. 9 depicts an example of a computing system for implementing certain embodiments described herein.

User system 135 may be any suitable computer system including, for example, any of user devices 825a-c of FIG. 8 and/or computing device 900 of FIG. 9. A user may utilize user system 135 to access the image editing system 100 via user interface (UI) subsystem 155.

Image editing system 100 may include any suitable computer system including, for example, server computer 805 of FIG. 8 and/or computing device 900 of FIG. 9. In certain embodiments, image editing system 100 provides users with image editing functionality, including an image editor 105. Image editing functionality may include the ability to edit images regarding the size, shape, color, or any other attribute of an image or portion of an image. For example, as used throughout, image editor 105 is configured to provide users with a shot-matching function, in which the color grading of a source image is modified to match the color grading of the reference image. Examples of such shot-matched source images are described in more detail with respect to FIG. 7. A color grading refers to a set of values of color parameters of an image that has been enhanced by a user or defined by the camera that captured the image. For example, a user enhances the appearance of an image by modifying the values of color parameters of the image. Non-limiting examples of color parameters of the image may include the hue, luminance, saturation, gain, and any suitable color parameters used for image editing. In some implementations, the color parameters include three sets of color parameter values; one set of color parameter values for each of the various tones including highlight, midtone, and shadow (e.g., midtone hue or shadow saturation). The values of the color parameters of an image represent a color grading. As an illustrative example, when a first image is captured by a first camera and a second image is captured by a second camera, the color grading of the first image is different from the color grading of the second image. In some cases, the first and second cameras have different image sensors. Thus, the color grading between the first and second images are different due to the inherent differences between the image sensors of the two cameras. The first and second images may also be captured by the same camera, but under different lighting conditions. The shot-matching functionality provided by the image editor 105 may automatically modify the color grading of the first image, for example, to match the color grading of the second image, or vice versa. Further, as a benefit of the aspects and features described herein, the shot-matching functionality provided by the image editor 105 detects semantic information within the two images to enhance the shot-matching performance.

Image editor 105 may be implemented using software, hardware, firmware, or any combination thereof. In some implementations, the image editor 105 includes UI subsystem 155, which a user accesses using a user system 135. The image editor 105 also includes a generative adversarial network 110 for performing some or all of the image editor 105 functionality (e.g., the shot-matching functionality described herein).

In some implementations, generative adversarial network 110 includes a generator model 115, a discriminator model 120, and a shot-matched output 125. The generator model 115 may be a model trained using training data set 130 and one or more machine-learning or artificial-intelligence techniques. Further, the generator model 115 includes a neural network configured to receive the reference image 165 and the source image 170. The generator model 115 is trained to modify the color grading of the source image 170 to match the color grading of the reference image 165. During the training of the generator model 115, the generator model 115 learns the characteristics of the color-matched images of each color-matched image pair included in the training data set 130. Once successfully trained, the generator model 115 generates a predictive modification parameter value that represents a prediction of color parameter values, which when applied to the source image, would generate a modified source image that is color-matched with the reference image. In this case, the generator model 115 modifies the color grading of the source image to mimic the learned characteristics of the color-matched image pairs of the training data set. The generator model 115 is further described with respect to FIG. 2. While only three components are depicted in the generative adversarial network 110 of FIG. 1 (e.g., the generator model 115, the discriminator model 120, and the shot-matched output 125), the generative adversarial network 110 may include any number of components or neural network layers.

The generator model 115 is trained to generate the modification parameter values that are used to modify the source image to be color-matched with the reference image. For example, the generator model 115 generates nine (9) separate color parameter values (e.g., highlight hue, highlight saturation, highlight gain, midtone hue, midtone saturation, midtone gain, shadow hue, shadow saturation, and shadow gain). In some implementations, an output node of the generator model 115 is used to output one of each of the color parameter values, such that a weight associated with the output node for each color parameter value may be adjusted to ensure the color parameter values used by an image modification layer (shown in FIG. 2) result in the expected output image. In some implementations, the generator model 115 includes the image modification layer that applies the modification parameter values to the source image 170 to generate the modified source image 180. In other implementations, the generator model 115 does not include the image modification layer.

The image modification layer described above is used to perform an image editing function, and more specifically, a shot-matching function used for image editing by image editor 105. The image modification layer edits or modifies the source image based on the received input parameters (e.g., applies the color parameter values predicted by the previous layers to the source image). Upon determining the color parameter values of the source image 170, the image modification layer applies the modification parameter values generated by the generator model 115 to the source image to generate the modified source image 180. Accordingly, in use, beginning with user system 135, the user provides a reference image indicated by arrow 140 and a source image as indicated by 145 using a user interface that is displayed or provided on user system 135 via UI subsystem 155. Other communications may be transmitted or received indicated by arrow 150. The UI subsystem 155 receives the reference image 165 and source image 170 and provide the reference image 165 (as shown by arrow 165) and the source image 170 (as shown by arrow 170) as an input to the generative adversarial network 110. Within the generative adversarial network 110, the source image is also be routed to the discriminator model 120 as shown by arrow 165.

In some implementations, the discriminator model 120 is a deep neural network included in the generative adversarial network 110. The discriminator model 120 receives the modified source image 180 generated by the generator model 115 and the reference image 165. In response to receiving the modified source image 180 and the reference image 165, the discriminator model 120 can be trained to generate an output that indicates a likelihood that the modified source image 180 and the reference image 165 are color-matched. For example, the trained discriminator model 120 infers whether or not the modified source image 180 and the reference image 165 are color-matched. The discriminator model 120 evaluates the color-matched image pairs included in the training data set 130 using a neural network. The neural network evaluates each image of a color-matched image pair of the training data set 130 to learn the characteristics shared between the color gradings of two images that are color-matched (e.g., that the images of a color-matched image pair have similar color gradings). The discriminator model 120 also learns the characteristics of color-matched image pairs from the synthetic image pairs generated by the generator model 115. The trained discriminator model 120 discriminates between the color grading of the modified source image and the color grading of the reference image to infer whether or not the modified source image and the reference image are color-matched (e.g., based on the characteristics of the shared color gradings of color-matched image pairs that were learned during the training of the discriminator model). In certain embodiments, the output of the trained discriminator model 120 represents a probability that the modified source image is color-matched with the reference image.

The discriminator model 120 may also receive (as inputs) a color-matched image pair from the training data set 130. In this case, the discriminator model 120 generates a probability of the color-matched image pair being color-matched. The probability indicates an extent to which the color-matched image pair is color-matched (e.g., which would be high because each color-matched image pair of the training data set has already been color-matched). The probabilities outputted by the discriminator model 120 (e.g., one probability generated for the synthetic image pair generated by the generator model 115 and another probability generated for the color-matched image pair from the training data set 130) are used to calculate a loss. The calculated loss is used as a feedback to the generator model 115. The generator model 115 evaluates the feedback and accordingly updates the neural network of the generator model 115, so that future predicted modification color parameters outputted by the generator model 115 make the modified source image more closely color-matched to the reference image. The more closely color-matched the modified source image is to the reference image, the less likely the discriminator model 120 will be able to detect that the modified source image was generated by the generator model 115.

In certain embodiments, during training of the discriminator model 120, the ground truth probabilities of the two pairs are provided (e.g., the synthetic image pair generated by the generator model 115 and the color-matched image pair from the training data set 130). For example, the discriminator model 120 may be configured with information indicating that an image pair is from the training data set 130, which is color-matched, and provided with a probability of 1 as ground truth. Similarly, for example, the synthetic image pair generated by the generator model 115 may be provided with a probability of zero as the ground truth. The probabilities predicted for the two pairs and the actual ground truth probabilities are used to calculate the loss of the discriminator model 120. The calculated loss is fed to the generator model 115 as the feedback to update the neural network of the generator model 115.

In some implementations, each of the generator model 115 and the discriminator model 120 are pre-trained using a training data set of color-matched image pairs. For example, pre-training the generator model 115 includes initializing one or more weights of the neural network to enable the generator model 115 to begin generating outputs (e.g., the modification parameter value) above an accuracy threshold. The set of image pairs used for pre-training are color-matched within an error threshold (e.g., the color gradings may not be exact matches). The discriminator model 120 is also trained using the same set of image pairs.

Once the generative adversarial network 110 receives the reference image 165 and the source image 170, which have not yet been shot-matched, the generative adversarial network 110 processes the images in some embodiments. The reference image 165 and the source image 170 may be passed through one or more neural network layers of the generator model 115. The reference image (as shown by arrow 165) and the source image (as shown by arrow 170) may be provided within the generative adversarial network 110 to generative model 115. The generator model 115 may process the reference image 165 and source image 170 to generate one or more modification parameter values for one or more color parameters (e.g., color parameters including three sets of hue, luminance, and saturation values, one set for each of shadows, midtones, and highlights). In some implementations, the modification parameter values are transmitted to the image modification layer (illustrated in FIG. 2) to be applied to the source image. The present disclosure is not limited to the examples of color parameters described above (e.g., hue, luminance, and saturation), and thus, any number of color parameters may be used in the implementations described herein.

Referring again to the discriminator model 120, the discriminator model 120 may generate an output indicating the likelihood that the modified source image 180 and the reference image 165 are color-matched. For example, the discriminator model 120 generates a value representing a probability that the modified source image 180 and the reference image 165 are a shot-matched pair. The probability generated by the discriminator model 120 for the synthetic image pair generated by the generator model 115 may indicate an extent to which the modified source image and the reference image of the synthetic image pair are color-matched. The discriminator model 120 learns the characteristics of image pairs that are color-matched from the training data set 130. The calculated loss may be transmitted back to the generator model 115 as feedback signal 195, so that the generator model 115 can be updated or improved. The value may also be transmitted to shot-matched output images 125. When the value of signal 185 indicates that the modified source image 180 and the reference image 165 are color-matched, then the shot-matched output images 125 may transmit the modified source image 180 and the reference image 165 to the UI subsystem 155, as shown in arrow 190. When the value of signal 185 indicates that the modified source image 180 and the reference image 165 are not color-matched, then the modified source image 180 is not considered as a shot-matched version of the reference image 165. The generator model 115 may generate another modified source image to shot-match the source image 170 and the reference image 165 after the generator model 115 is updated using feedback signal 195.

Training data set 130 may be a data structure that stores a set of color-matched image pairs. For example, generating the set of color-matched image pairs may be performed by the image editing system 100. The set of color-matched image pairs may be automatically generated and used to train each of the generator model 115 and the discriminator model 120. The steps involved in automatically generating the training data set 130 are further described with respect to FIGS. 3, 5, and 6.

The UI subsystem may then provide the output image received from the generative adversarial network 110 to the user via the user interface on the user system 135. For example, arrow 190 represents the generative adversarial network 110 transmitting the source image, the reference image, and the shot-matched source image (or any combination thereof) to the UI subsystem 155. The user system 135 may operate the image editor 105 to further modify and finalize the modified source image 180.

Figure 2:
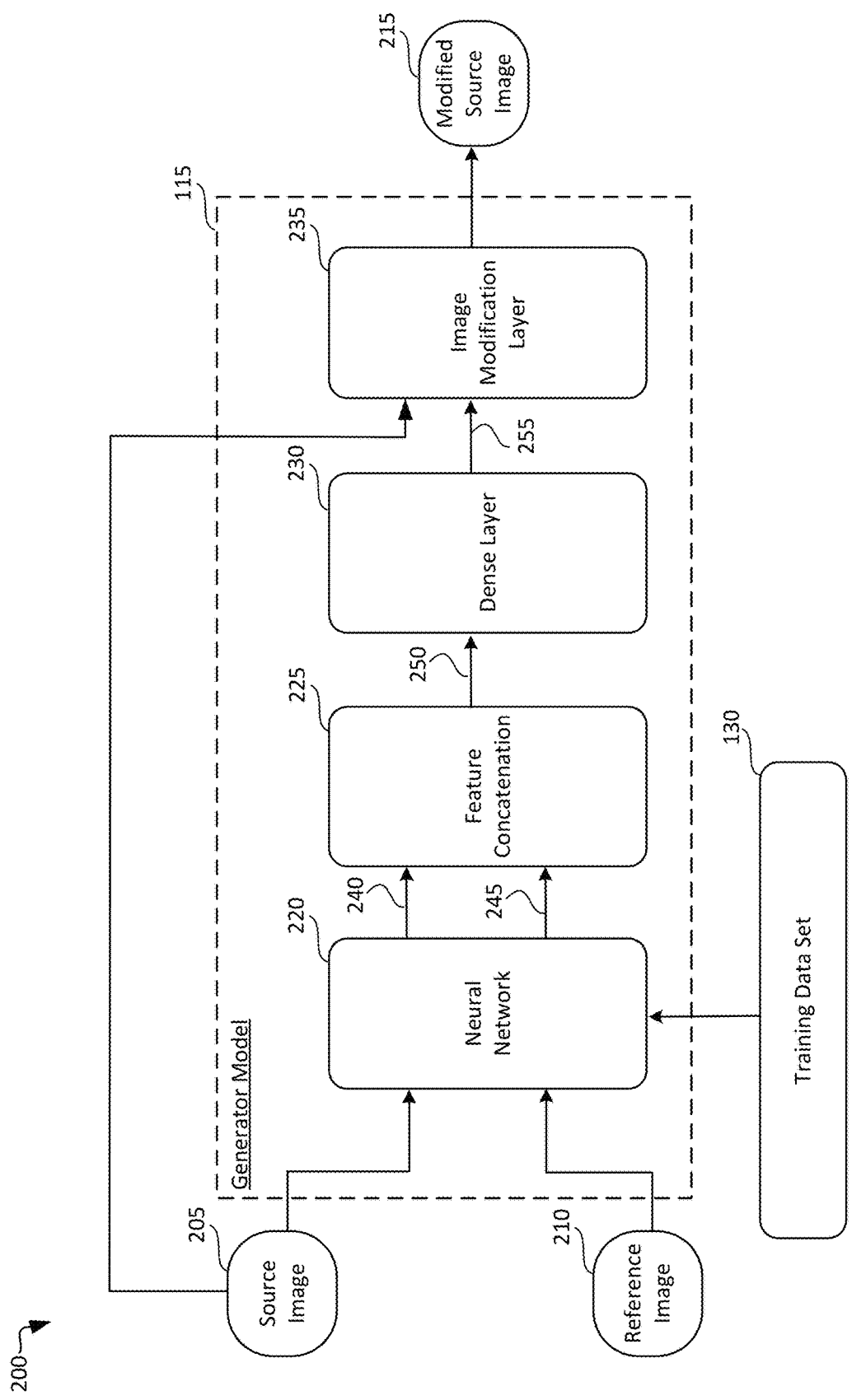
FIG. 2 depicts an example of a network environment for generating a modified source image using a generator model of a generative adversarial network, according to some aspects of the present disclosure.

FIG. 2 depicts an example of a network environment for generating a modified source image using a generator model of a generative adversarial network, according to some aspects of the present disclosure. The generator model 115 in this example may be configured to generate modification parameter values that can be used to modify the values of the color grading of the source image 205 to shot-match the source image 205 to the reference image 210. Process flow 200 may include a source image 205, reference image 210, generator model 115, modified source image 205, and training data set 130. The generator model 115 may include a neural network layer 220, a feature concatenation system 225, a dense layer 230, and an image modification layer 235.

The process flow 200 may begin with a user providing to the image editing system 100 or the image editor 105 with a source image 205 and a reference image 210. The source image 205 and the reference image 210 may be color graded differently from each other. The user may wish to have the color grading of the source image 205 modified to appear similar to the color grading of the reference image 210. In some cases, the source image 205 may have no color grading (e.g., may be a raw image), and the user may wish to have the color grading of the reference image 210 applied to the raw source image 205. Such image editing may be automatically performed and may include, for example, color mapping, sizing, shot-matching, and the like. Within the generator model 115, the source image 205 and reference image 210 may be provided as inputs to the neural network 220.

In some implementations, the neural network 220 is, for example, a residual neural network. Neural network 220 may include a neural network for each of the source image 205 and the reference image 210. In some cases, neural network 220 processes the source image 205 and the reference image 210 sequentially and individually. The neural network 220 may process the source image 205 to generate an output 240 representing features of the source image 205. Similarly, the neural network 220 may process the reference image 210 to generate an output 245 representing features of the reference image 210. In some implementations, the features detected by the neural network 220 are evaluated to identify semantic information from the color distribution within the source and reference images. The semantic information may include specific features within the source and reference images including, for example, object identification. As an illustrative example, each of the source image 205 and reference image 210 includes images of people and animals. Additionally, the source image 205 is a color image, whereas, the reference image is a black-and-white image, except that the animals within the image are illustrated in color. Given this example scenario, the neural network 220 learns to detect features that represent animals.

The output features 240 of the source image 205 and the output features 245 of the reference image 210 may be received at the feature concatenation system 225, which may concatenate the output features 240 and the output features 245 together. The concatenated features 250 can then be transmitted to a dense neural network layer 230 for further training. The dense layer 230 may be a fully-connected neural network, in which every node of a first layer is individually connected to each node of a second layer. The output 255 of the dense layer 230 may correspond to the one or more modification parameter values that are predicted by the generator model 115. The one or more modification parameter values may represent values that are predicted to modify the raw source image or the color grading of the source image 205 to color-match with the color grading of the reference image 210. The one or more modification parameter values may be generated based on the characteristics of color-matched image pairs that the generator model 115 learned from the training data set 130. For example, the generator model 115 is trained to generate the modified source image 215 to appear as if the modified source image 215 is color-matched with the reference image 210. The one or more modification parameters may be transmitted to the image modification layer 235 as an input. The source image 205 may also be inputted into the image modification layer 235. The image modification layer 235 may be configured to apply the one or more modification parameter values to the source image 205 to generate the modified source image 215. In some implementations, the image modification layer 235 may calculate a local gradient for each modification parameter value of the one or more modification parameter values, for example, by using the method of small differences. The output of the image modification layer 235 may be the modified source image 215, which is provided to the discriminator model 120 as an input.

Figure 3:
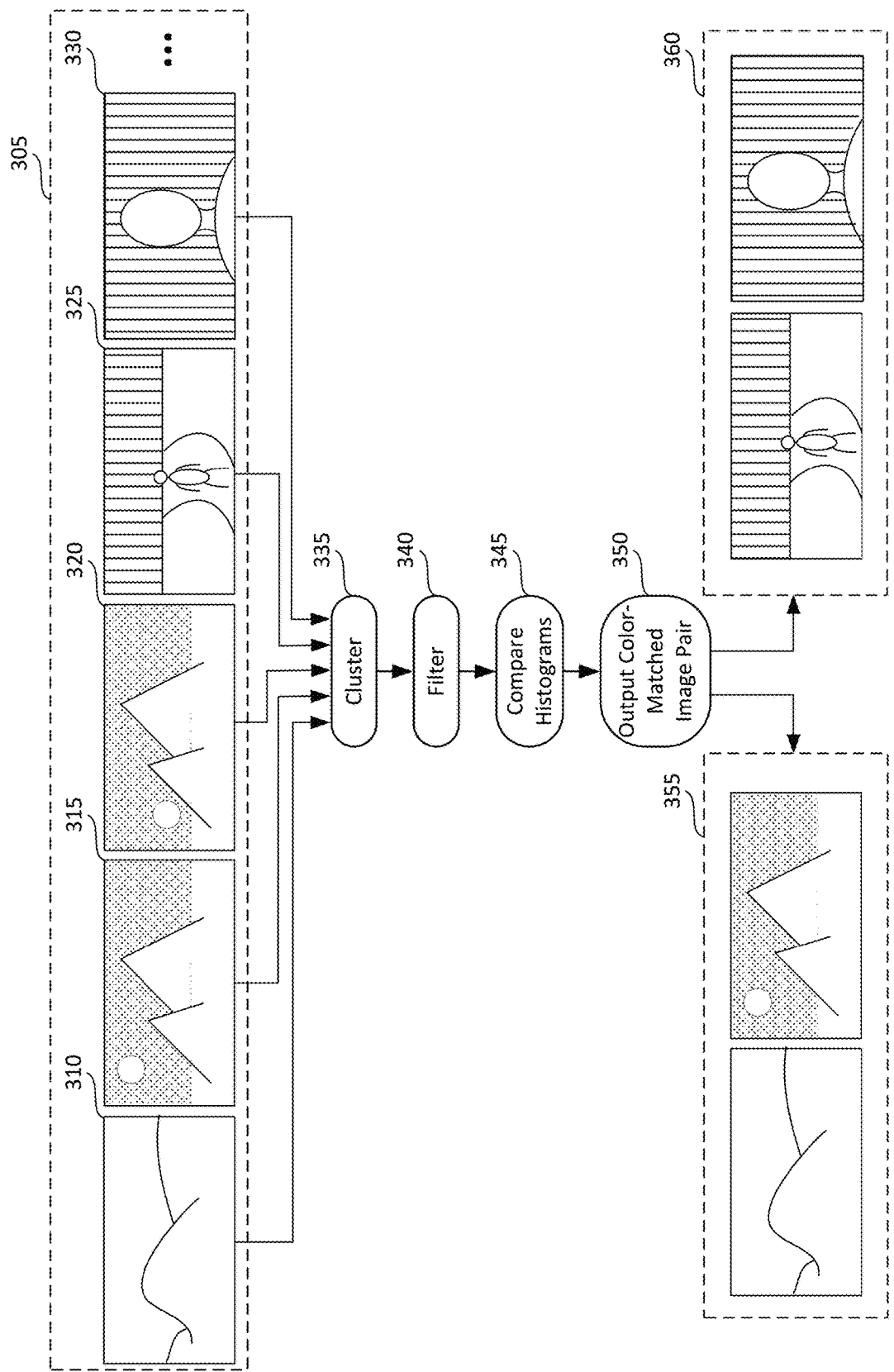
FIG. 3 depicts an example of a process for automatically generating a set of color-matched image pairs used to train the generative adversarial network, according to some aspects of the present disclosure.

FIG. 3 depicts an example of a process 300 for automatically generating a set of color-matched image pairs used to train the generative adversarial network, according to some aspects of the present disclosure. Video data 305 may include one or more image frames, such as image frames 310 through 330. For example, the image frames 310 through 330 may be extracted from the video data 305 (e.g., at one frame per second). The image editing system 100 may process video data 305 to automatically generate a set of color-matched image pairs 355 and 360 that can be used to train the generator model 115 and the discriminator model 120 of the generative adversarial network 110.

The image editing system 100 may perform a clustering operation 335 on the one or more image frames of the video data 305. For example, image frames 310 through 330 may be clustered based on the color features included within each video frame. Image frames with similar color content or color features may be grouped together (e.g., based on the histograms of the image frames). As a result of the clustering, the image editing system 100 may cause one or more groups of image frames to be formed. In some implementations, the image editing system 100 generates a color space, such as a Euclidean space representing RGB (red, green, blue), YUV, or CIE (International Commission on Illumination) values. Each image frame extracted from video data 305 may be plotted within the color space. In some examples, the clustering operation 335 is based at least in part in a distance between images represented in the color space. Each group may include one or more image frames of the video data 305 that share a color distribution as determined by a clustering algorithm (e.g., k-means, k-nearest neighbor, density-based clustering, fuzzy clustering, hierarchical clustering, and other suitable clustering techniques).

Additionally, the image editing system 100 may perform a filtering operation 340 on each group of the one or more groups of images formed by the clustering operation 335. For the image frames included in each group, the image editing system 100 may pass the image frames into a neural network to generate one or more features of the image frame. The one or more features of the image frame may be compared with the one or more features of other image frames within the group to determine whether two image frames satisfy a content similarity threshold. For example, the content similarity threshold may be satisfied when the distance between the features of the two image frames is equal to or less than a threshold distance, which indicates that the two images share the same or similar content. When the content similarity threshold is satisfied, the image editing system 100 may remove (e.g., filter out) the two image frames from the group. The image editing system 100 may continue to filter image frames out of the group as long as two image frames within the group satisfy the content similarity threshold.

In some implementations, the image editing system 100 generate a histogram for each remaining image frame within the group. The image editing system 100 may then perform a comparison operation 345 to compare two histograms to determine whether the two histograms are similar. A histogram may be a graphical representation of a value distribution of a color parameter of an image frame. For example, a histogram may graph the saturation values of an image frame. The histogram associated with an image frame within a group may be compared against the histogram associated with each remaining image frame within the group. During the comparison of the histograms, the image editing system 100 may determine whether the two image frames are color-matched or not. If the comparison of the two histograms indicates that the two image frames share the same or similar histograms (e.g., share a color grading), then the image editing system 100 may perform an output operation 350. Performing output operation 350 may include selecting the two image frames as a color-matched image pair and outputting the image pair to training data set 130 as training data for the generative adversarial network 110.

As an illustrative example, color-matched image pairs 355 and 360 each include two image frames that do not share similar content because the image frames with similar content were removed at operation 340. The color-matched image pairs 355 and 360, however, do share a common color grading, as indicated by the histograms of the two image frames being determined as similar by the comparison operation 345. Thus, as a technical benefit, the image editing system 100 may automatically process the extracted image frames of the video data 305 to generate a set of color-matched image pairs that can be used to train the generative adversarial network to detect semantic information from images, thereby enhancing the shot-matching functionality of the image editor 105.

Figure 4:
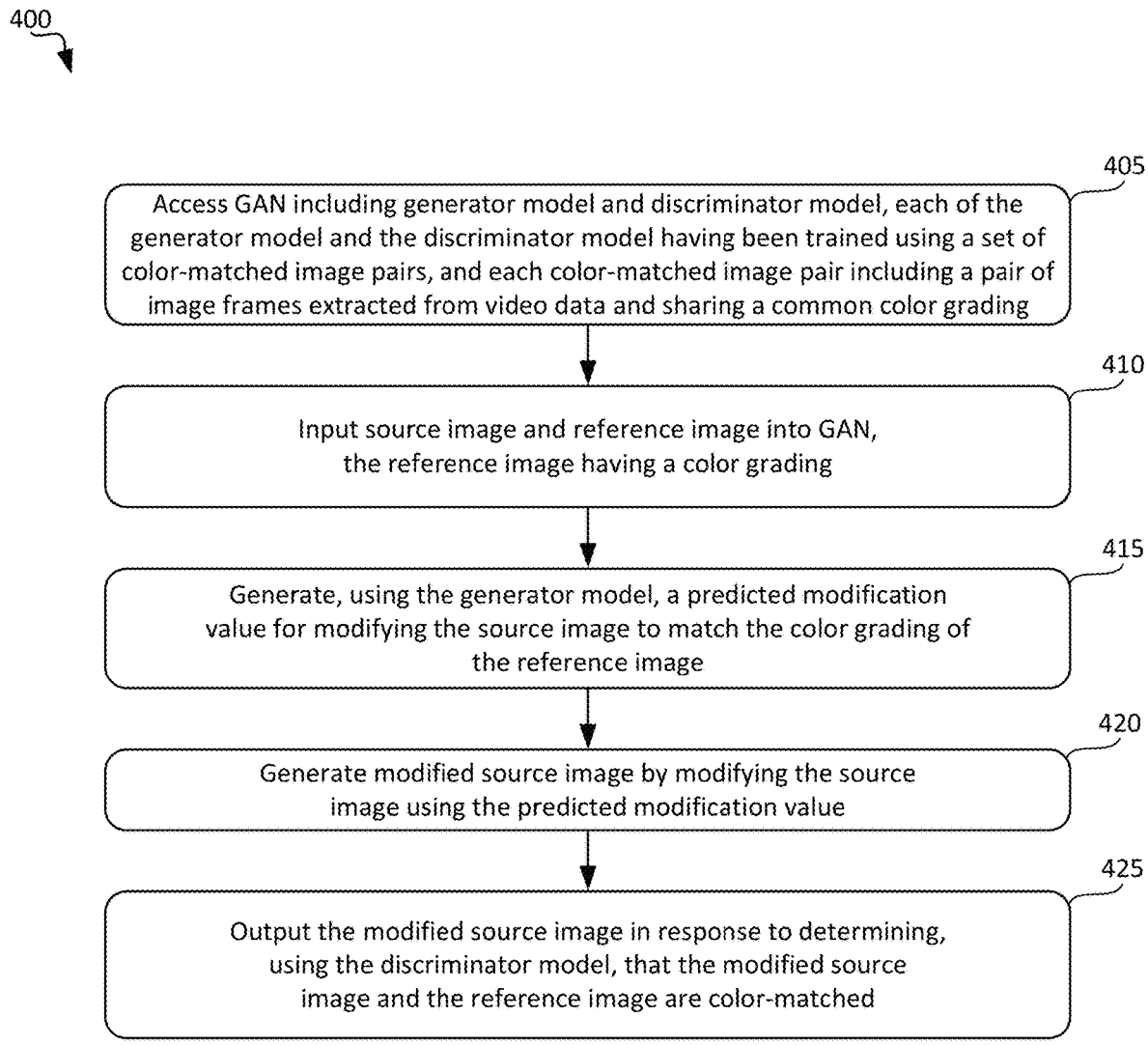
FIG. 4 depicts an example of a process for shot-matching two images, according to some aspects of the present disclosure.

FIG. 4 depicts an example of a process 400 for shot-matching two images with different color gradings, according to some aspects of the present disclosure. Process 400 may be performed at least in part by any of the hardware-based computing devices illustrated in FIGS. 1-2 or FIGS. 8-9. For example, process 400 may be performed by one or more servers included in the image editing system 100, the image editor 105, or the generative adversarial network 110. As a further example, image editor 105 may perform process 400 as part of an image editing function, such as shot-matching, to modify the color grading of a source image to match the color grading of a reference image in a context-sensitive manner that evaluates semantic information detected from the source and reference images.

Process 400 may begin at block 405, for example, where the image editing system 100 or the image editor 105 may access a generative adversarial network (GAN) to perform an image editing function, such as shot-matching the source and reference images. The generative adversarial network may include a generator model and a discriminator model. Each of the generator model and the discriminator model may be trained using a set of color-matched image pairs of a training data set. For example, the set of color-matched image pairs used for training may be automatically generated by the image editing system 100 using the process flow described in FIG. 3 above or FIG. 5 below. The set of color-matched image pairs may be stored at training data set 130 illustrated in FIG. 1. As described in FIG. 3 above, the set of color-matched image pairs may include a pair of image frames that were extracted from video data, such as video data 305. The pair of image frames may include two image frames extracted from the video data and grouped together because the two image frames share a common color grading. The common color grading may define a value of a color parameter (e.g., hue, luminance, and saturation) shared by each image frame of the pair.

At block 410, the source image and the reference image may be inputted into the generative adversarial network. For example, the source image and the reference image may each be inputted into the generator model of the generative adversarial network. In some cases, the source image and the reference image may have different color gradings. In other cases, the source image may be a raw image, and the reference image may have a color grading. Inputting the source image and the reference image into the generative adversarial network generate outputs that are used to modify the source image to be shot-matched with the reference image.

At block 415, the generator model 115 may generate modification parameter values that can be used to modify the color grading of the source image to match the color grading of the reference image. The generator model may be trained using the set of color-matched image pairs. For example, the modification parameter values may be one or more color parameter values that can be used to modify the existing color parameter values of the source image. The modification parameter values generated by the generator model may represent one or more color parameter values that are predicted to modify the source image to be shot-matched with the reference image.

At block 420, the image editor 105 may apply the modification values generated by the generator model 115 to the source image to generate the modified source image. In some implementations, the image modification layer 235 may apply the modification parameter values to the color grading of the source image. At block 425, the modified source image may be outputted by the generative adversarial network 110 in response to determining, using the discriminator model 120, that the modified color grading of the modified source image and the color grading of the reference image are color-matched. In this case, the modified source image may represent a source image that has been modified to be shot-matched with the reference image. The discriminator model 120 may be trained to determine a probability of two images being color-matched. For example, if the likelihood that the two images are color-matched is above a threshold (e.g., over 85% probability), the discriminator model may generate an output that indicates that the modified source image and the reference image are color-matched. The color-matched source and reference images can then be provided to a user device for further processing using the image editor application. If the likelihood is below the threshold, then the discriminator model may generate an output that indicates that the modified source image is not color-matched with the reference image. A loss may be calculated based on the probability or probabilities outputted by the discriminator model. The calculated loss may be fed back to the generator model 115 to improve the next modified source image generated by the generator model 115 (e.g., by modifying the source image in a manner that makes the modified source image more color-matched with the reference image).

Figure 5:
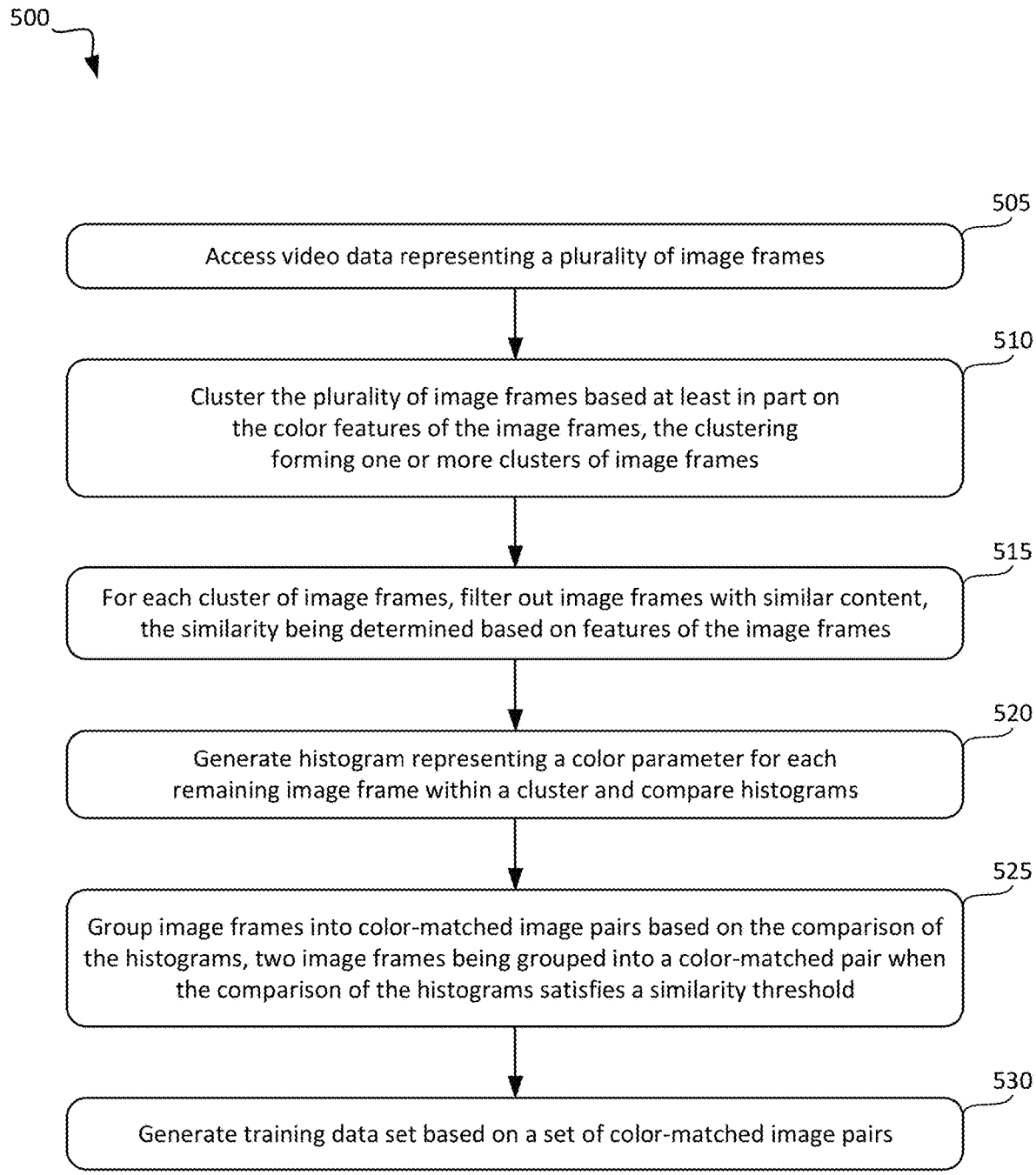
FIG. 5 depicts an example of a process for generating a training data set used for training the generative adversarial network, according to some aspects of the present disclosure.

FIG. 5 depicts an example of a process 500 for generating a training data set to train the generative adversarial network, according to some aspects of the present disclosure. Process 500 may be performed at least in part by any of the hardware-based computing devices illustrated in FIGS. 1-2 or FIGS. 8-9. For example, process 500 may be performed by one or more servers included in the image editing system 100. As a further example, image editing system 100 may perform process 500 to automatically generate training data to train the generative adversarial network 110, which is used to perform one or more image editing functions, such as shot-matching.

Process 500 may begin at block 505, for example, where the image editing system 100 accesses video data comprised of one or more of videos. Each video may be comprised of a plurality of image frames. At block 510, the image editing system 100 may perform a clustering operation to cluster the plurality of image frames of the video data based on color content. Non-limiting examples of clustering techniques may include k-means, k-nearest neighbor, density-based clustering, fuzzy clustering, hierarchical clustering, and other suitable clustering techniques. The clustering operation may result in the formation of one or more clusters of image frames that share content.

At block 515, for each cluster of the one or more clusters of image frames, the image editing system 100 may filter the image frames within the cluster to remove image frames that have similar content (e.g., remove images that satisfy a content similarity threshold). For example, each image frame within a cluster may be inputted into a neural network, such as a residual network (e.g., ResNet). The neural network may output one or more features detected within the image frame for a particular layer. The image editing system 100 may compare the features detected from two image frames within the cluster to determine whether the two image frames include similar content. If the compared features satisfy a content similarity threshold (e.g., the distance between two features is within a threshold distance), then the two image frames are removed from the cluster. Otherwise, the image frames are maintained in the cluster of images. The comparison process is repeated until the image frames with similar content are removed from the cluster.

In some implementations, at block 520, for each image frame remaining in the cluster, the image editing system 100 may generate a histogram representing a color parameter of that image frame. For example, the image editing system 100 may generate a histogram representing the value distribution of the hue parameters of an image frame. The histogram may be a graphical representation of the value distribution of any color parameter of the image frame. The histograms representing the value distribution of a color parameter for two remaining image frames may be compared to determine whether the image frames are color-matched or not. If the histograms are the same or similar (e.g., within a color similarity threshold), then the image editing system 100 may determine that the two image frames are color-matched. If the histograms are not the same or are not similar (e.g., beyond a color similarity threshold), then the image editing system 100 may determine that the two image frames are not color-matched. At block 525, the image editing system 100 may group two image frames together when the image editing system 100 determines that the histograms of the two image frames are the same or similar (e.g., satisfying the color similarity threshold). At block 530, the two image frames grouped together may be stored as training data in the training data set 130 as a color-matched image pair. The grouping of pairs of image frames within a cluster of image frames may continue to generate the set of color-matched image pairs.

As a technical benefit, the set of color-matched image pairs may be automatically generated from video data, and thus, the challenges of using a professional colorist to generate color-matched image pairs for training neural networks can be avoided.

Figure 6:
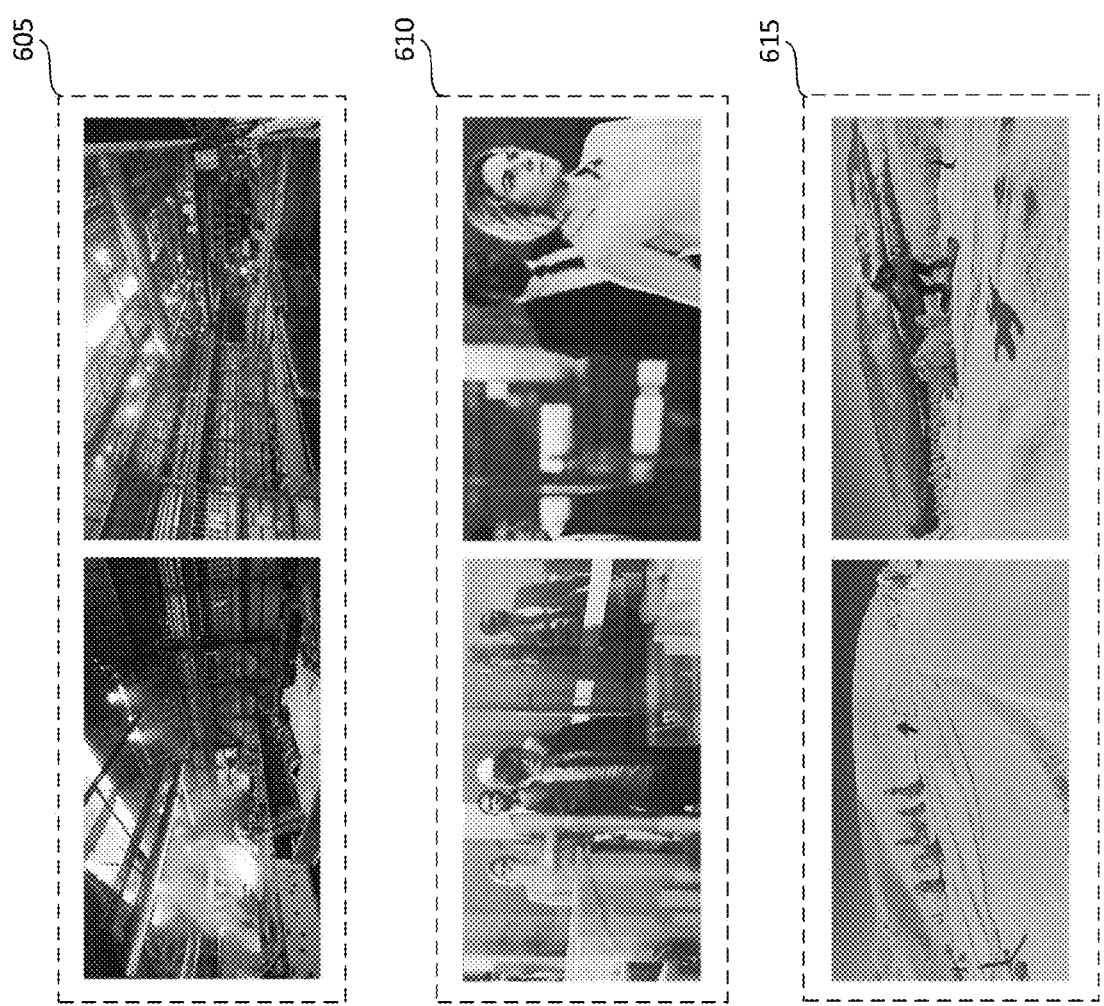
FIG. 6 depicts an example of a set of color-matched image pairs used to train a generative adversarial network, according to some aspects of the present disclosure.

FIG. 6 depicts an example of a set of color-matched image pairs 605, 610, and 615 used to train a generative adversarial network, according to some aspects of the present disclosure. As an illustrative example, color-matched image pair 605 may be comprised of two image frames extracted from video data. While the two image frames of color-matched image pair 605 may have different content, the two image frames have the same color grading. The histogram comparison described with respect to FIG. 5 can be used to determine whether two image frames have the same color grading. Similarly, each of color-matched image pairs 610 and 615 are comprised of two image frames with different content but similar or the same color grading. Training the generative adversarial network using the automatically-generated color-matched image pairs is technically beneficial. For example, the generative adversarial network can learn semantic information from the different color distributions of the image frames, which enables the generative adversarial network to efficiently perform shot-matching, even in situations with extreme color distribution. Further, the generative adversarial network can evaluate the color-matched image pairs to learn the characteristics that make two image color-matched (e.g., the network may learn that two images with the characteristic of having the same color grading may be color-matched).

Figure 7:
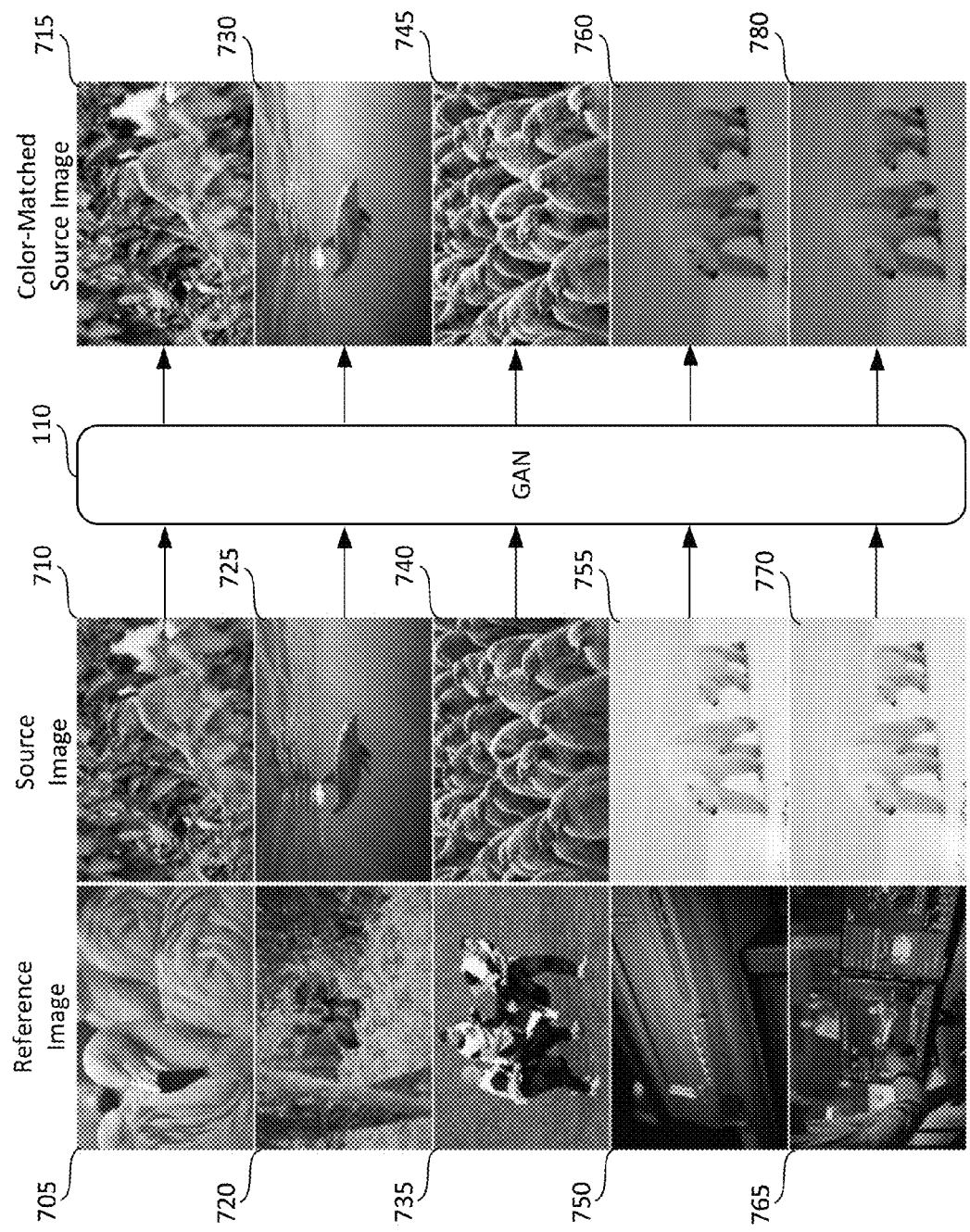
FIG. 7 depicts an example of shot-matching reference images and source images using a generative adversarial network, according to some aspects of the present disclosure.

FIG. 7 depicts an example of shot-matching reference images and source images using a generative adversarial network, according to some aspects. The reference image 705 may have a first color grading or may be a raw image with no color grading. The source image 710 may have a second color grading. The first color grading may be different from the second color grading, or a user may wish to apply the color grading of the reference image to the raw source image. For example, the reference image 705 and the source image 710 may have different color gradings because the two images may have been captured using different cameras or using the same camera but different setting or lighting conditions. Similarly, reference image 720 may have a different color grading than source image 725; reference image 735 may have a different color grading than source image 740; reference image 750 may have a different color grading than source image 755; and reference image 765 may have a different color grading than source image 770.

The generative adversarial network 110 may be trained to modify a source image to be shot-matched or color-matched with a corresponding reference image. The generative adversarial network 110 may generate modification values that may be applied to a raw source image or to the color grading of the source image to modify the source image. The modified source image may be shot-matched with the reference image.

Each pair of reference and source images may be inputted into the generative adversarial network 110. The generative adversarial network 110 may generate an output of a shot-matched source image. For example, reference image 705 and source image 710 may be inputted into the generative adversarial network 110, and in response, the color-matched source image 715 may be generated. Further, the color-matched source image 715 may be presented to the user system 135 using UI subsystem 155. The output generated by the generative adversarial network 110 (e.g., the color-matched source image and the reference image) may be stored in a memory (e.g., within the UI subsystem 155). A user may operate the user system 135 to further modify the color-matched source image 715.

Examples of Computing Environments for Implementing Certain Embodiments

Any suitable computing system or group of computing systems can be used for performing the operations described herein. For example, FIG. 9 depicts an example of computing device 900 that may be at least a portion of image editing system 100. The implementation of the computing device 900 could be used for one or more of the image editor 105 or the user system 135. In an embodiment, a single image editing system 100 having devices similar to those depicted in FIG. 9 (e.g., a processor, a memory, etc.) combines the one or more operations and data stores depicted as separate subsystems in FIG. 1. Further, FIG. 8 illustrates a cloud computing system 800 by which at least a portion of the image editing system 100 may be offered.

In some embodiments, the functionality provided by the image editing system 100 may be offered as cloud services by a cloud service provider. For example, FIG. 8 depicts an example of a cloud computing system 800 offering an image editing service that can be used by a number of user subscribers using user devices 825a, 825b, and 25c across a data network 820. In the example, the image editing service may be offered under a Software as a Service (SaaS) model. One or more users may subscribe to the image editing service, and the cloud computing system performs the processing to provide the image editing service to subscribers. The cloud computing system may include one or more remote server computers 805.

The remote server computers 805 include any suitable non-transitory computer-readable medium for storing program code (e.g., an image editing system 100) and program data 810, or both, which is used by the cloud computing system 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 805 can include volatile memory, non-volatile memory, or a combination thereof.

One or more of the servers 805 execute the program code 810 that configures one or more processors of the server computers 805 to perform one or more of the operations that provide image editing services, including the ability to utilize the generative adversarial network 110 to perform shot-matching and other image editing techniques. As depicted in the embodiment in FIG. 8, the one or more servers providing the services to perform image editing via the generative adversarial network 110 may include access to the models of the generative adversarial network 110 including the generator model 115 and the discriminator model 120. Any other suitable systems or subsystems that perform one or more operations described herein (e.g., one or more development systems for configuring an interactive user interface) can also be implemented by the cloud computing system 800.

In certain embodiments, the cloud computing system 800 may implement the services by executing program code and/or using program data 810, which may be resident in a memory device of the server computers 805 or any suitable computer-readable medium and may be executed by the processors of the server computers 805 or any other suitable processor.

In some embodiments, the program data 810 includes one or more datasets and models described herein. Examples of these datasets include image data, new image content, image energy data, etc. In some embodiments, one or more of data sets, models, and functions are stored in the same memory device. In additional or alternative embodiments, one or more of the programs, data sets, models, and functions described herein are stored in different memory devices accessible via the data network 815.

The cloud computing system 800 also includes a network interface device 815 that enable communications to and from cloud computing system 800. In certain embodiments, the network interface device 815 includes any device or group of devices suitable for establishing a wired or wireless data connection to the data networks 820. Non-limiting examples of the network interface device 815 include an Ethernet network adapter, a modem, and/or the like. The image editing system 100 is able to communicate with the user devices 825a, 825b, and 825c via the data network 820 using the network interface device 815.

FIG. 9 illustrates a block diagram of an example computer system 900. Computer system 900 can be any of the described computers herein including, for example, image editor 105, user system 135, or server computer 805. The computing device 900 can be or include, for example, a laptop computer, desktop computer, tablet, server, or other electronic device.

The computing device 900 can include a processor 935 interfaced with other hardware via a bus 905. A memory 910, which can include any suitable tangible (and non-transitory) computer readable medium, such as RAM, ROM, EEPROM, or the like, can embody program components (e.g., program code 915) that configure operation of the computing device 900. Memory 910 can store the program code 800, program code 915, program data 917, or both. In some examples, the computing device 900 can include input/output ("I/O") interface components 925 (e.g., for interfacing with a display 940, keyboard, mouse, and the like) and additional storage 930.

The computing device 900 executes program code 915 that configures the processor 935 to perform one or more of the operations described herein. Examples of the program code 915 include, in various embodiments, the generative adversarial network 110 including the generator model 115 and the discriminator model 120, the image editing function, or any other suitable systems or subsystems that perform one or more operations described herein (e.g., one or more development systems for configuring an interactive user interface). The program code 915 may be resident in the memory 910 or any suitable computer-readable medium and may be executed by the processor 940 or any other suitable processor.

The computing device 900 may generate or receive program data 917 by virtue of executing the program code 915. For example, source image 205, reference image 210, and modified source image 215 are all examples of program data 917 that may be used by the computing device 900 during execution of the program code 915.

The computing device 900 can include network components 920. Network components 920 can represent one or more of any components that facilitate a network connection. In some examples, the network components 920 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 920 can be wired and can include interfaces such as Ethernet, USB, or IEEE 1394.

Although FIG. 9 depicts a single computing device 900 with a single processor 935, the system can include any number of computing devices 900 and any number of processors 935. For example, multiple computing devices 900 or multiple processors 935 can be distributed over a wired or wireless network (e.g., a Wide Area Network, Local Area Network, or the Internet). The multiple computing devices 900 or multiple processors 935 can perform any of the steps of the present disclosure individually or in coordination with one another.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A system comprising:
   one or more processors; and
   a non-transitory computer-readable medium implementing a trained generative adversarial network (GAN) comprising:
   a trained generator model configured for (a) generating a predicted modification parameter value for modifying one or more color parameters of a source image to color-match with a color grading of a reference image, and (b) generating a modified source image by modifying the one or more color parameters of the source image using the predicted modification parameter value; and
   a trained discriminator model configured for (a) evaluating the modified source image and the reference image, and (b) generating an output indicating a likelihood that the modified source image and the reference image are color-matched;
   wherein the trained generative adversarial network is further configured to automatically generate a training data set used for training at least one of the trained generator model or the trained discriminator model by clustering a plurality of image frames to obtain one or more pairs of image frames for each of one or more clusters of two or more image frames that have similar color gradings and represent content data.

2. The system of claim 1, wherein in response to the trained discriminator model determining that the modified source image and the reference image are not color-matched, transmitting a feedback signal to the trained generator model, wherein the trained generator model is updated based on the feedback signal.

3. The system of claim 1, wherein the trained generative adversarial network is further configured for:
   extracting a plurality of image frames from video data, each image frame of the plurality of image frames representing the content data;
   generating a histogram of a color parameter for each image frame of the plurality of image frames; and
   using the generated histograms and a color similarity threshold to cluster the plurality of image frames.

4. The system of claim 3, wherein generating the training data set further comprises:
   selecting a pair of image frames from the one or more pairs of image frames within a cluster;
   extracting one or more features from each of the image frames of the selected pair of image frames, the one or more features being extracted from the content data of each image frame of the selected pair of image frames;
   determining whether the one or more features extracted from each of the image frames of the selected pair of image frames satisfy a content similarity threshold, and wherein when the content similarity threshold is satisfied, the two image frames of the selected pair of image frames are determined to share similar content;
   in response to determining that the content similarity threshold is satisfied, removing the two image frames from the cluster of image frames; and
   generating a set of color-matched image pairs from the image frames remaining in the cluster of image frames, the set of color-matched image pairs being used as the training data set.

5. The system of claim 4, wherein:
   each of the generator model and the discriminator model are trained using the training data set, wherein the training configures the generator model to learn one or more characteristics of a color-matched image pair of the set of color-matched image pairs, and wherein the training configures the discriminator model to determine a likelihood that two image frames share a common color grading.

6. The system of claim 1, wherein modifying the source image using the predicted modification parameter value further comprises:
   identifying a value of a color parameter associated with the source image; and
   modifying the value of the color parameter using the predicted modification parameter value, and wherein the modification transforms the source image to color-match with the color grading of the reference image.

7. The system of claim 1, wherein a second output generated using the trained discriminator model corresponds to a first value when the trained discriminator model determines that the modified source image and the reference image are color-matched, and wherein the second output generated using the trained discriminator model corresponds to a second value when the trained discriminator model determines that the modified source image and the reference image are not color-matched.

8. A computer-implemented method comprising:
   extracting a plurality of image frames from video data;
   clustering the plurality of image frames to obtain two or more pairs of image frames for each of a plurality of clusters of two or more image frames that share similar color grading and represent content data;

generating a set of color-matched image pairs using the two or more pairs of image frames for each of the plurality of clusters; and inputting the set of color-matched image pairs into a generative adversarial network (GAN) for training a generator model and a discriminator model, the generator model and the discriminator model being trained to color-match a source image to a color grading of a reference image.

9. The computer-implemented method of claim 8, further comprising:

in response to the trained discriminator model determining that a modified source image and the reference image are not color-matched, transmitting a feedback signal to the trained generator model, wherein the trained generator model is updated based on the feedback signal.

10. The computer-implemented method of claim 8, further comprising:

generating a histogram of a color parameter for each image frame of the plurality of image frames; and using the generated histograms and a color similarity threshold to cluster the plurality of image frames and provide a training data set to train the generator model and the discriminator model.

11. The computer-implemented method of claim 10, wherein generating the training data set further comprises:

selecting a pair of image frames from the one or more pairs of image frames within a cluster;

extracting one or more features from each of the image frames of the selected pair of image frames, the one or more features being extracted from the content data of each image frame of the selected pair of image frames;

determining whether the one or more features extracted from each of the image frames of the selected pair of image frames satisfy a content similarity threshold, and wherein when the content similarity threshold is satisfied, the two image frames of the selected pair of image frames are determined to share similar content;

in response to determining that the content similarity threshold is satisfied, removing the two image frames from the cluster of image frames; and generating the set of color-matched image pairs from the image frames remaining in the cluster of image frames, the set of color-matched image pairs being used as the training data set.

12. The computer-implemented method of claim 11, further comprising:

training each of the generator model and the discriminator model using the training data set, wherein the training configures the generator model to learn one or more characteristics of a color-matched image pair of the set of color-matched image pairs, and wherein the training configures the discriminator model to determine a likelihood that two image frames share a common color grading.

13. The computer-implemented method of claim 8, further comprising:

modifying the source image using a predicted modification parameter value generated by the trained generator model, wherein modifying the source image includes:

identifying a value of a color parameter associated with the source image; and modifying the value of the color parameter using the predicted modification parameter value, and wherein the modification transforms the source image to color-match with the color grading of the reference image.

14. The computer-implemented method of claim 8, wherein a second output generated using the trained discriminator model corresponds to a first value when the trained discriminator model determines that a modified source image and the reference image are color-matched, and wherein the second output generated using the trained discriminator model corresponds to a second value when the trained discriminator model determines that the modified source image and the reference image are not color-matched.

15. A computer-program product tangibly embodied in a non-transitory machine-readable storage medium, including instructions configured to cause a data processing apparatus to perform operations including:

clustering a plurality of image frames to obtain clusters of two or more image frames for each cluster that have similar color grading and represent content data;

using a set of color-matched image pairs produced from the clusters of two or more image frames to produce a trained generator model and a trained discriminator model;

inputting a source image and a reference image into a trained generative adversarial network (GAN) including the trained generator model and the trained discriminator model, the reference image having a color grading, and the trained GAN having been trained to color-match the source image and the reference image;

generating, using the trained generator model, a predicted modification parameter value for modifying one or more color parameters of the source image to color-match with the color grading of the reference image;

generating a modified source image by modifying the one or more color parameters of the source image using the predicted modification parameter value; and outputting the modified source image and the reference image in response to determining, using the trained discriminator model, that the modified source image and the reference image are color-matched.

16. The non-transitory machine-readable storage medium of claim 15, wherein the operations further comprise:

in response to the trained discriminator model determining that the modified source image and the reference image are not color-matched, transmitting a feedback signal to the trained generator model, wherein the trained generator model is updated based on the feedback signal.

17. The non-transitory machine-readable storage medium of claim 15, wherein the operations further comprise:

generating a histogram of a color parameter for each image frame of the plurality of image frames; and using the generated histograms and a color similarity threshold to cluster the plurality of image frames and provide a training data set to produce the trained generator model and the trained discriminator model.

18. The non-transitory machine-readable storage medium of claim 17, wherein generating the training data set further comprises:

selecting a pair of image frames from the one or more pairs of image frames within a cluster;

extracting one or more features from each of the image frames of the selected pair of image frames, the one or more features being extracted from the content data of each image frame of the selected pair of image frames;

determining whether the one or more features extracted from each of the image frames of the selected pair of image frames satisfy a content similarity threshold, and wherein when the content similarity threshold is satisfied, the two image frames of the selected pair of image frames are determined to share similar content;

in response to determining that the content similarity threshold is satisfied, removing the two image frames from the cluster of image frames; and generating a set of color-matched image pairs from the image frames remaining in the cluster of image frames, the set of color-matched image pairs being used as the training data set.

19. The non-transitory machine-readable storage medium of claim 18, wherein the operations further comprise:

training each of the generator model and the discriminator model using the training data set, wherein the training configures the generator model to learn one or more characteristics of a color-matched image pair of the set of color-matched image pairs, and wherein the training configures the discriminator model to determine a likelihood that two image frames share a common color grading.

20. The non-transitory machine-readable storage medium of claim 15, wherein modifying the source image using the predicted modification parameter value further comprises:

identifying a value of a color parameter associated with the source image; and modifying the value of the color parameter using the predicted modification parameter value, and wherein the modification transforms the source image to color-match with the color grading of the reference image.

* * * * *